(12) United States Patent
Yoshioka et al.

(10) Patent No.: US 8,997,470 B2
(45) Date of Patent: Apr. 7, 2015

(54) EXHAUST GAS PURIFYING DEVICE FOR INTERNAL COMBUSTION ENGINE

(75) Inventors: Mamoru Yoshioka, Susono (JP); Noriaki Kumagai, Susono (JP); Naoya Takagi, Mishima (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 0 days.

(21) Appl. No.: 13/635,065

(22) PCT Filed: Mar. 17, 2010

(86) PCT No.: PCT/JP2010/054534
§ 371 (c)(1),
(2), (4) Date: Sep. 14, 2012

(87) PCT Pub. No.: WO2011/114453
PCT Pub. Date: Sep. 22, 2011

(65) Prior Publication Data
US 2013/0011300 A1 Jan. 10, 2013

(51) Int. Cl.
*F01N 3/00* (2006.01)
*F01N 3/20* (2006.01)
*F01N 3/28* (2006.01)
*F01N 3/05* (2006.01)

(52) U.S. Cl.
CPC ............ *F01N 3/2046* (2013.01); *F01N 3/2853* (2013.01); *F01N 3/055* (2013.01); *F01N 3/2013* (2013.01); *F01N 3/2026* (2013.01); *Y02T 10/26* (2013.01); *F01N 2900/1602* (2013.01)

(58) Field of Classification Search
CPC .............................. F01N 3/055; F01N 3/2853
USPC ..................................... 60/300, 298, 303, 320
See application file for complete search history.

(56) References Cited

U.S. PATENT DOCUMENTS 3,180,712 A * 4/1965 Hamblin ....................... 422/171
3,820,327 A * 6/1974 Henault ........................... 60/286
5,094,074 A   3/1992 Nishizawa et al.
(Continued)

FOREIGN PATENT DOCUMENTS

JP    4-171214 A    6/1992
JP    5-269387 A    10/1993
(Continued)

OTHER PUBLICATIONS

English Machine translation of JP2008-291801 to Kawabuchi, Tomoko.*
(Continued)

*Primary Examiner* — Thomas Denion
*Assistant Examiner* — Anthony Ayala Delgado
(74) *Attorney, Agent, or Firm* — Sughrue Mion, PLLC

(57) ABSTRACT

An exhaust gas purifying device for an internal combustion engine, including: an electrically heated catalyst which has a catalyst carrier supporting a catalyst and a carrier retention unit which is provided on an outer periphery of the catalyst carrier, which retains the catalyst carrier, and which has an electrical insulation property; and a cooling unit which cools the carrier retention unit. Therefore, it is possible to prevent the temperature of the carrier retention unit from becoming high, and it becomes possible to appropriately ensure the insulation property of the electrically heated catalyst. Hence, it becomes possible to expand a condition range in which the current can be applied to the electrically heated catalyst.

10 Claims, 12 Drawing Sheets

(56) References Cited

U.S. PATENT DOCUMENTS

| | | | |
|---|---|---|---|
| 5,140,813 A * | 8/1992 | Whittenberger | 60/300 |
| 6,021,640 A * | 2/2000 | Hirota et al. | 60/300 |
| 7,188,468 B2 * | 3/2007 | Fukusako et al. | 60/285 |
| 7,455,920 B2 * | 11/2008 | Sakai | 429/414 |
| 2001/0047938 A1 * | 12/2001 | Nelson et al. | 204/426 |
| 2002/0139114 A1 | 10/2002 | Dickau | |
| 2005/0126138 A1 * | 6/2005 | Anderson et al. | 55/498 |
| 2010/0146943 A1 * | 6/2010 | Muramatsu et al. | 60/286 |

FOREIGN PATENT DOCUMENTS

| | | | |
|---|---|---|---|
| JP | 2002-21541 A | | 1/2002 |
| JP | 2008-190437 A | | 8/2008 |
| JP | 2008-291801 A | | 12/2008 |
| JP | 2008291801 A | * | 12/2008 |
| JP | 2010-223159 A | | 10/2010 |
| JP | 2010-242724 A | | 10/2010 |
| WO | WO 2010109304 A1 | | 9/2010 |

OTHER PUBLICATIONS

International Search Report for PCT/JP2010/054534 dated Jun. 15, 2010.

* cited by examiner

201: ACCELERATOR OPENING DEGREE SENSOR
202: VEHICLE SPEED SENSOR

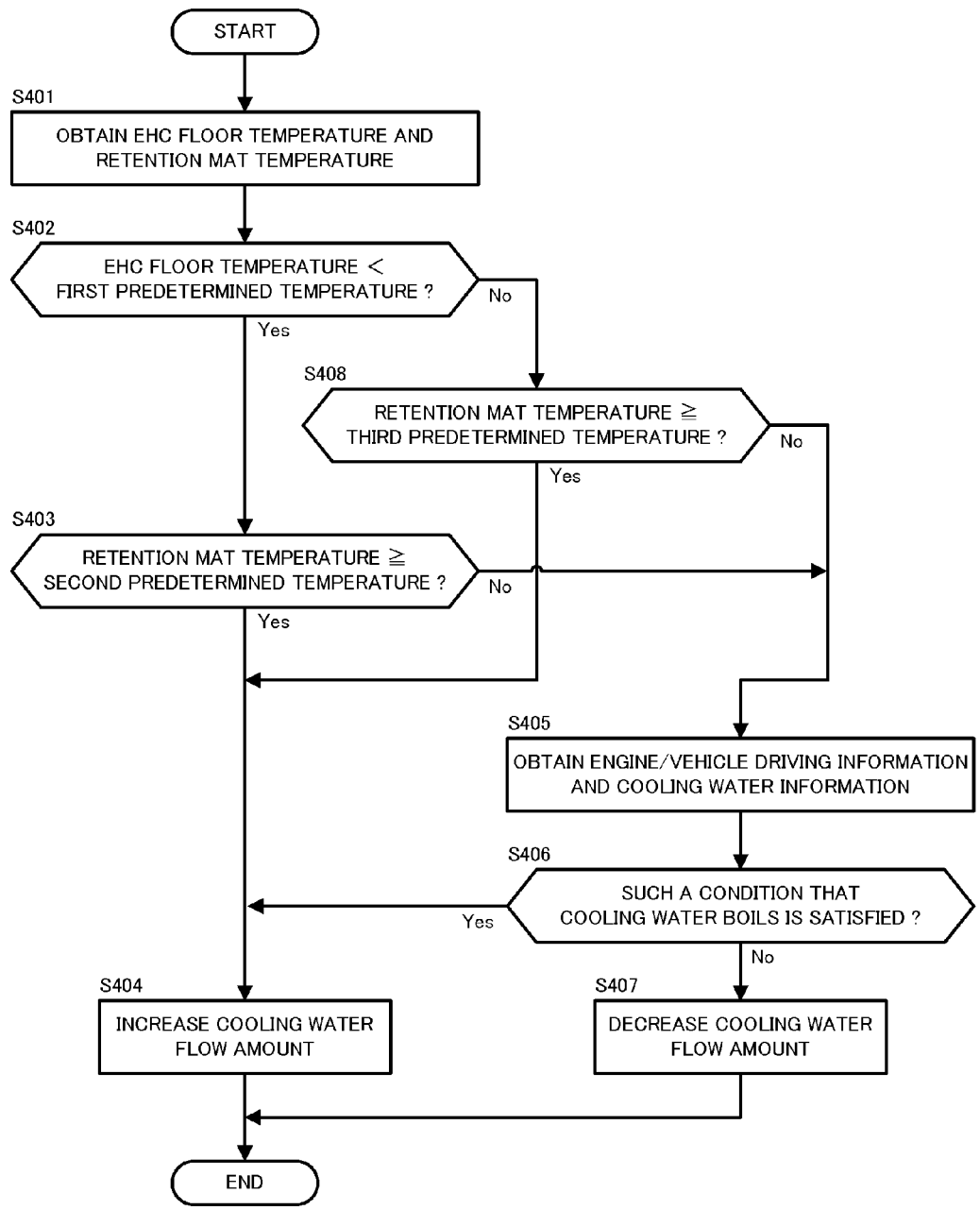

EXHAUST GAS PURIFYING DEVICE FOR INTERNAL COMBUSTION ENGINE

CROSS REFERENCE TO RELATED APPLICATIONS

This application is a National Stage of International Application No. PCT/JP2010/054534 filed Mar. 17, 2010, the contents of which are incorporated herein by reference in their entirety.

TECHNICAL FIELD

The present invention relates to an exhaust gas purifying device for an internal combustion engine including an electrically heated catalyst.

BACKGROUND TECHNIQUE

Conventionally, there is proposed a technique for purifying an exhaust gas by using an electrically heated catalyst (hereinafter suitably referred to as "EHC") provided on an exhaust passage. For example, in Patent Reference-1, there is proposed a technique for estimating a possibility of an electrical leak of the EHC based on a current or a voltage of the EHC, and for restricting a supply of an electric power to the EHC when there is a possibility of the electrical leak. Additionally, in Patent Reference-2, there is proposed an EHC including a ring-like mat member formed by an electrical insulating material, which has a shock-absorbing characteristic and is positioned between an outer periphery of a catalyst carrier and an inner periphery of a metal shell.

Hereinafter, a component which supports the catalyst in the EHC is referred to as "EHC carrier", and a component which retains the EHC carrier is referred to as "retention mat".

PRIOR ART REFERENCE

Patent Reference

Patent Reference-1: Japanese Patent Application Laid-open under No. 2002-21541
Patent Reference-2: Japanese Patent Application Laid-open under No. 5-269387

DISCLOSURE OF INVENTION

Problem to be Solved by the Invention

Though the retention mat retaining the EHC carrier has an insulation property, the insulation property tends to change by a condition of the retention mat. For example, when the retention mat becomes a high temperature, it is thought that an insulation resistance of the retention mat decreases. Therefore, when the retention mat is in such a high-temperature state that the temperature is higher than a predetermined temperature, it is thought that there is a possibility that the insulation property of the EHC is not ensured. The techniques described in Patent References 1 and 2 do not consider the above relationship between the temperature of the retention mat and the insulation property.

The present invention is made to solve the problem described above, and it is an object of the invention to provide an exhaust gas purifying device for an internal combustion engine which can ensure an insulation property of an EHC by forcibly cooling a retention mat.

Means for Solving the Problem

According to one aspect of the present invention, there is provided an exhaust gas purifying device for an internal combustion engine, including: an electrically heated catalyst which has a catalyst carrier supporting a catalyst and a carrier retention unit which is provided on an outer periphery of the catalyst carrier, which retains the catalyst carrier, and which has an electrical insulation property; and a cooling unit which cools the carrier retention unit.

The above exhaust gas purifying device for the internal combustion engine includes the electrically heated catalyst (EHC) which purifies the exhaust gas of the internal combustion engine and is warmed by applying the current. The electrically heated catalyst includes the catalyst carrier supporting the catalyst and the carrier retention unit which retains the catalyst carrier and has the electrical insulation property. The catalyst carrier corresponds to the EHC carrier, and the carrier retention unit corresponds to the retention mat. Here, when the carrier retention unit becomes the high temperature, the insulation property of the carrier retention unit tends to decrease. So, the cooling unit forcibly cools the carrier retention unit in order to prevent the decrease in the insulation property of the carrier retention unit due to the high-temperature carrier retention unit. Therefore, it is possible to prevent the temperature of the carrier retention unit from becoming high, and it becomes possible to appropriately ensure the insulation property of the electrically heated catalyst. Hence, it becomes possible to expand a range of a condition in which the current can be applied to the electrically heated catalyst.

In a manner of the above exhaust gas purifying device for the internal combustion engine, when a temperature of the catalyst is lower than a first predetermined temperature and a temperature of the carrier retention unit is equal to or higher than a second predetermined temperature, the cooling unit cools the carrier retention unit so that the temperature of the carrier retention unit decreases.

In the above manner, when the temperature of the catalyst is lower than the first predetermined temperature and the temperature of the carrier retention unit is equal to or higher than the second predetermined temperature, the cooling unit cools the carrier retention unit. In contrast, when the temperature of the catalyst is equal to or higher than the first predetermined temperature or the temperature of the carrier retention unit is lower than the second predetermined temperature, the cooling unit does not cool the carrier retention unit. This is because, if the carrier retention unit is cooled when the temperature of the catalyst is equal to or higher than the first predetermined temperature, for example, there is a possibility that the catalyst makes the transition from an activated state to a no-activated state due to the decrease in the temperature of the catalyst. So, in consideration of both the catalyst warming and the insulation property, the cooling unit switches between the execution and the inexecution of the cooling of the carrier retention unit. Therefore, it is possible to appropriately prevent the excess cooling of the catalyst due to the execution of the cooling.

As a preferred example, the first predetermined temperature is set based on a determination temperature for determining a catalyst warming, and the second predetermined temperature is set based on a determination temperature for determining the insulation property of the carrier retention unit. For example, the first predetermined temperature is set based on a determination temperature for determining whether or not the catalyst is in the activated state, and the second predetermined temperature is set based on a determination temperature for determining whether or not the insulation property of the carrier retention unit is ensured.

In another manner of the above exhaust gas purifying device for the internal combustion engine, when a temperature of the carrier retention unit is equal to or higher than a third predetermined temperature, the cooling unit cools the carrier retention unit so that the temperature of the carrier retention unit decreases.

In the above manner, when the temperature of the carrier retention unit is equal to or higher than the third predetermined temperature (for example, the temperature of the carrier retention unit becomes significantly high), the cooling unit cools the carrier retention unit. Concretely, even when the catalyst is in the activated state, the cooling unit cools the carrier retention unit when the temperature of the carrier retention unit is equal to or higher than the third predetermined temperature. Here, since the temperature of the carrier retention unit tends to become high during a high speed driving and/or a high load driving, such a state that the temperature of the carrier retention unit is higher than the temperature of the catalyst and the difference between the temperature of the carrier retention unit and the temperature of the catalyst is a lot can occur. Concretely, though the temperature of the catalyst is lower than an activating temperature, such a state that the retention mat is maintained at the high temperature can occur. In the said state, it is preferable to apply the current to the electrically heated catalyst. However, since the insulation of the carrier retention unit cannot be ensured, there is a possibility that the current cannot be applied to the electrically heated catalyst.

Thus, when the temperature of the carrier retention unit is equal to or higher than the third predetermined temperature, the cooling unit forcibly cools the carrier retention unit in order to preliminarily prevent the occurrence of the above state. Therefore, it is possible to preliminarily ensure the insulation property of the carrier retention unit, and it becomes possible to appropriately ensure such a state that the current can be applied to the electrically heated catalyst after the deceleration F/C. Additionally, by forcibly cooling the carrier retention unit, it is possible to appropriately prevent temperatures of components in the electrically heated catalyst from becoming high, and it becomes possible to improve a durability of the components.

As a preferred example, the third predetermined temperature is set to a temperature which is higher than a determination temperature for determining the insulation property of the carrier retention unit. For example, the third predetermined temperature is set to a determination temperature for determining whether or not the extreme increase in the temperature of the carrier retention unit occurs.

In another manner of the above exhaust gas purifying device for the internal combustion engine, the cooling unit includes a cooling medium passage which is provided on an outer periphery of a case covering the carrier retention unit, and in which a cooling medium for cooling the carrier retention unit flows along the outer periphery of the case, and the cooling unit includes a flow amount controlling unit which controls a flow amount of the cooling medium which flows in the cooling medium passage.

In the above manner, the cooling unit uses the cooling medium for cooling the carrier retention unit, and flows the cooling medium on the outer periphery of the case of the electrically heated catalyst so as to release the heat of the carrier retention unit from the outside of the case. Additionally, the flow amount controlling unit controls the flow amount of the cooling medium in the cooling medium passage. As an example, the flow amount controlling unit controls the flow amount of the cooling medium so as to switch the execution and the inexecution of the cooling of the carrier retention unit. As another example, the flow amount controlling unit controls the flow amount of the cooling medium in accordance with a degree of the decrease in the temperature of the carrier retention unit.

As a preferred example, the cooling unit further includes plural projections which are provided in the cooling medium passage and are formed to project from the case. The plural projections function as a heat release fin. Therefore, it is possible to improve an effect of the heat release by the cooling medium.

As a preferred example, the cooling unit uses an air as the cooling medium. Additionally, the flow amount controlling unit controls a valve which is provided on an air inlet of the cooling medium passage and switches between a flow and a cutoff of the air to the cooling medium passage by being set to an open state and a close state. Namely, the flow amount controlling unit controls the valve so as to switch the execution and the inexecution of the cooling of the carrier retention unit.

As a preferred example, the cooling unit uses cooling water for cooling the internal combustion engine, as the cooling medium. Additionally, when such a condition that the cooling water boils is satisfied, the flow amount controlling unit makes the flow amount of the cooling water larger than when the condition is not satisfied. Therefore, it is possible to appropriately prevent the boil of the cooling water.

BRIEF DESCRIPTION OF THE DRAWINGS

FIG. 13 is a flow chart showing a second cooling control process in a second embodiment.

DETAILED DESCRIPTION OF THE PREFERRED EMBODIMENTS

Preferred embodiments of the present invention will be explained hereinafter with reference to the drawings.

Device Configuration

Figure 1:
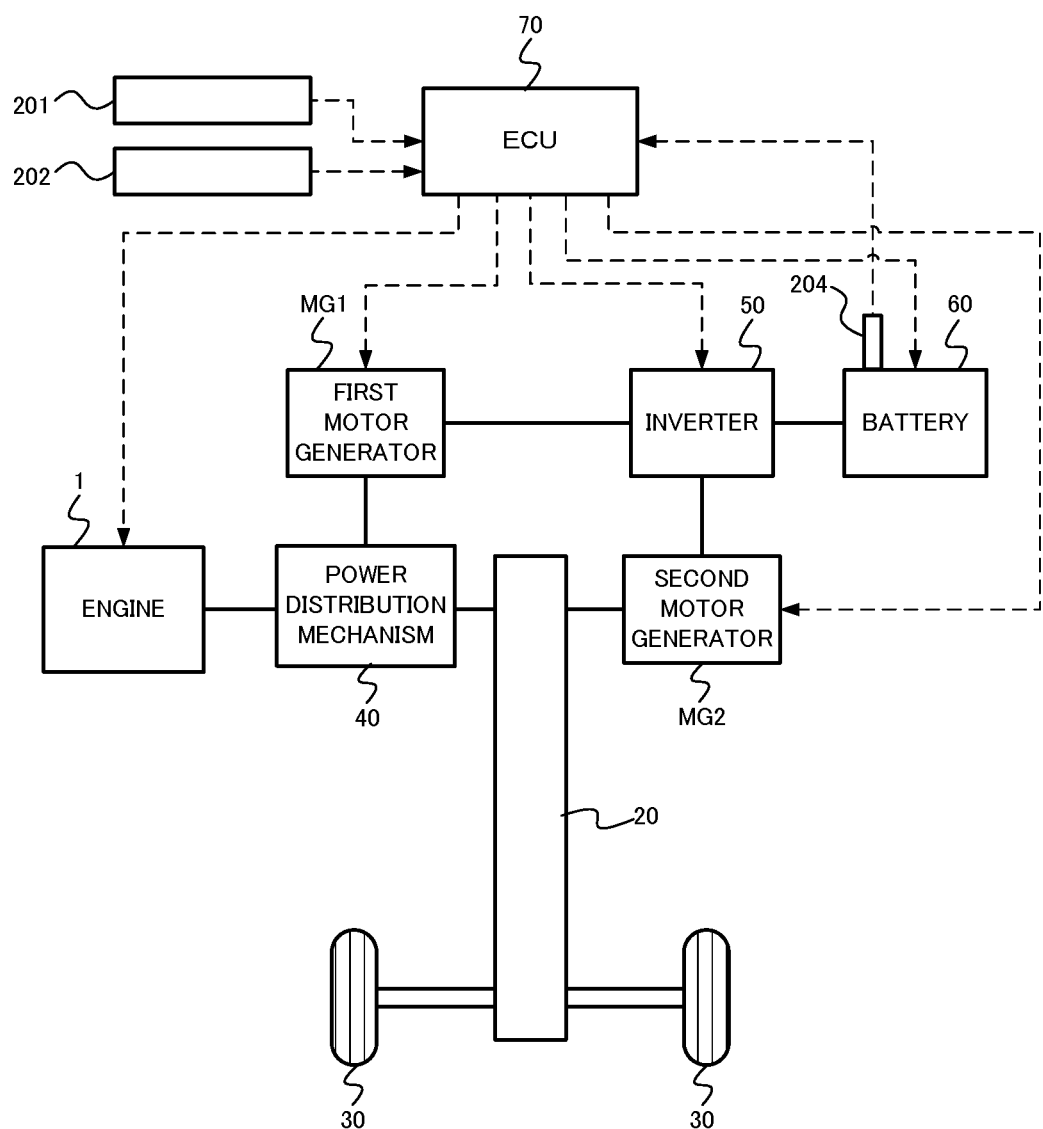
FIG. 1 shows a schematic configuration of a hybrid vehicle.

FIG. 1 shows a schematic configuration of a hybrid vehicle 100 in the embodiment. In FIG. 1, broken arrows show the input/output of signals.

The hybrid vehicle 100 mainly includes an engine (internal combustion engine) 1, an axle 20, wheels 30, a first motor generator MG1, a second motor generator MG2, a power distribution mechanism 40, an inverter 50, a battery 60 and an ECU (Electronic Control Unit) 70.

The axle 20 is a part of a power transmission system which transmits the power of the engine 1 and the second motor generator MG2 to the wheels 30. The wheels 30 are the wheels of the hybrid vehicle 100, and FIG. 1 especially shows only the right and left front wheels to simplify the explanation. The engine 1 is a gasoline engine, for example, and functions as a power source for outputting major driving force of the hybrid vehicle 100. For the engine 1, various controls are performed by the ECU 70.

The first motor generator MG1 is configured to function as a generator to mainly charge the battery 60 or a generator to supply the electric power to the second motor generator MG2, and performs the electric generation by the output of the engine 1. The second motor generator MG2 is configured to function as a generator to mainly assist the output of the engine 1. Additionally, the second motor generator MG2 functions as a regeneration brake during a braking such as an engine brake and a foot brake, and generates a braking force (regenerative braking force). Namely, the second motor generator MG2 has a regeneration capability of converting a kinetic energy into an electrical energy, and performs a regeneration operation so as to generate the electricity. The motor generators MG1 and MG2 are configured as a synchronous motor generator, for example, and include a rotor having plural permanent magnets on the outer circumferential surface and a stator around which three-phase coils are wound.

The power distribution mechanism 40 corresponds to the planetary gear having a sun gear and a ring gear, and is configured to distribute the output of the engine 1 to the first motor generator MG1 and the axle 20.

The inverter 50 is a DC/AC converter which controls the input/output of the electric power between the battery 60 and the first motor generator MG1, and controls the input/output of the electric power between the battery 60 and the second motor generator MG2. For example, the inverter 50 converts the AC electric power generated by the first motor generator MG1 to the DC electric power and supplies it to the battery 60. Additionally, the inverter 50 converts the DC electric power taken out from the battery 60 to the AC electric power and supplies it to the second motor generator MG2.

The battery 60 is configured to function as a power supply to drive the first motor generator MG1 and/or the second motor generator MG2, and to charge the electric power generated by the first motor generator MG1 and/or the second motor generator MG2. The battery 60 is provided with a SOC sensor 204 capable of detecting a state of charge (SOC) of the battery 60. The SOC sensor 204 provides the ECU 70 with a detection signal corresponding to the detected SOC.

In the following description, the expression of "motor generator MG" is used when the first motor generator MG1 and the second motor generator MG2 are not discriminated from each other.

The ECU 70 includes a CPU (Central Processing Unit), a ROM (Read Only Memory) and a RAM (Random Access Memory), and executes various controls to each constitutional elements in the hybrid vehicle 100. For example, the ECU 70 performs a control based on an accelerator opening degree detected by an accelerator opening degree sensor 201 and a vehicle speed detected by a vehicle speed sensor 202.

Figure 2:
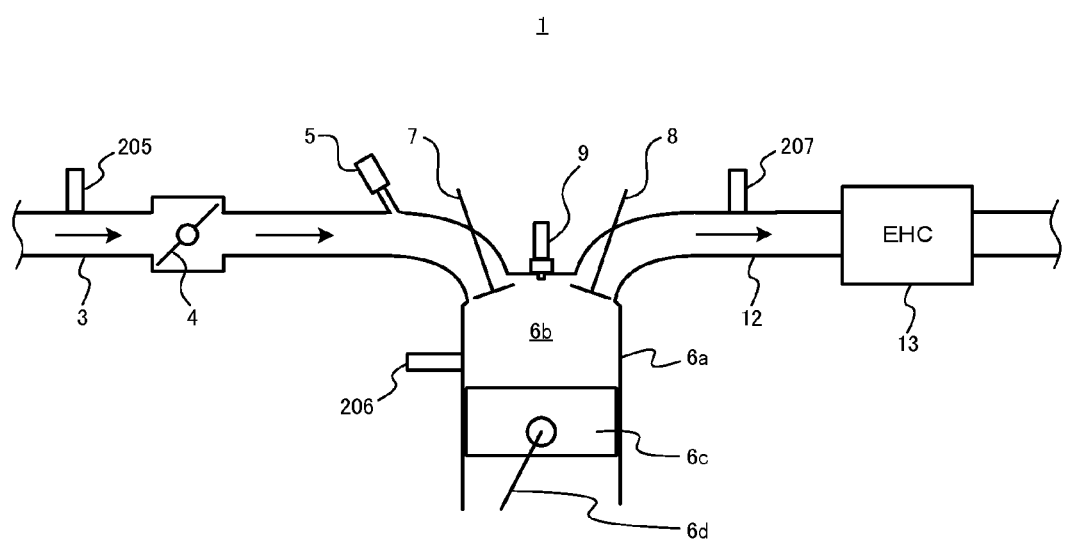
FIG. 2 shows a schematic configuration of an engine.

Next, a concrete description will be given of the engine 1, with reference to FIG. 2. FIG. 2 shows a schematic configuration of the engine 1.

The engine mainly includes an intake air passage 3, a throttle valve 4, a fuel injection valve 5, a cylinder 6a, an intake valve 7, an exhaust valve 8, a spark plug 9, an exhaust passage 12 and an EHC (electrically heated catalyst) 13. Though only one cylinder 6a is shown in FIG. 2 to simplify the explanation, the engine 1 actually includes plural cylinders 6a.

The intake air from the outside passes through the intake air passage 3, and the throttle valve 4 adjusts the flow amount of the gas passing through the intake air passage 3. The intake air passing through the intake air passage 3 is supplied to a combustion chamber 6b. The combustion chamber 6b is supplied with the fuel injected by the fuel injection valve 5, too. The intake valve 7 and the exhaust valve 8 are provided on the combustion chamber 6b. By opening and closing the intake valve 7, the flow and cutoff of the intake air in the intake air passage 3 is switched. By opening and closing the exhaust valve 8, the flow and cutoff of the exhaust gas in the exhaust passage 12 is switched.

In the combustion chamber 6b, the fuel-air mixture of the intake air and the fuel burns by the ignition of the spark plug 9. For the spark plug 9, the ECU 70 performs the control of the ignition timing. The piston 6c is reciprocated by the burning, and the reciprocation is transmitted to a crank axis (which is not shown) via the con rod 6d. As a result, the crank axis rotates. The exhaust gas generated by the burning in the combustion chamber 6b is discharged to the exhaust passage 12.

The exhaust passage 12 is provided with the EHC 13 which purifies the exhaust gas and is warmed by applying the current. The EHC 13 will be described in details, later. Another catalyst (for example, three-way catalyst) may be provided on the exhaust passage 12 at the downstream position of the EHC 13.

Additionally, the engine 1 is provided with various sensors. An air flow meter 205 is provided on the intake air passage 3 and detects an intake air amount. A water temperature sensor 206 is provided on a passage in which cooling water for cooling the engine 1 flows, and detects a temperature of the cooling water (hereinafter referred to as "engine water temperature"). An air-fuel ratio sensor 207 is provided on the exhaust passage 12, and detects an air-fuel ratio (A/F) of the exhaust gas. These sensors provide the detection signals to the ECU 70.

Figure 3A:
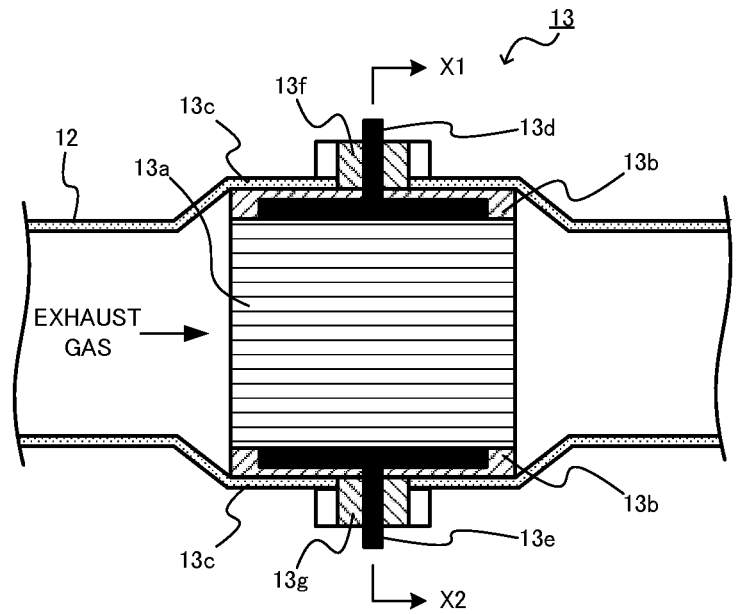
FIGS. 3A and 3B show schematic configurations of an EHC.
Figure 3B:
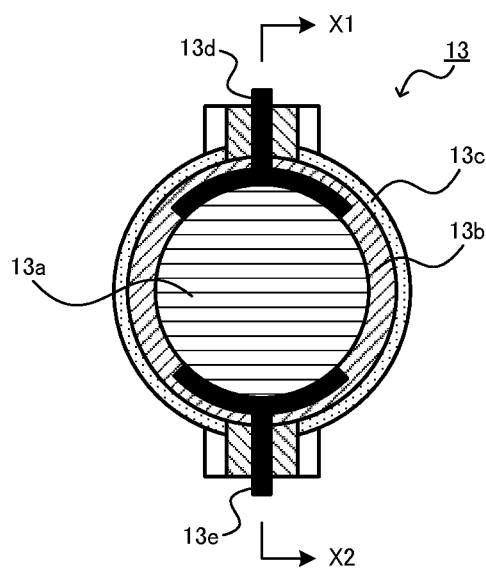

Next, a concrete description will be given of the EHC 13, with reference to FIGS. 3A and 3B. FIGS. 3A and 3B show schematic configurations of the EHC 13.

FIG. 3A shows a cross-sectional view of the EHC 13 along a longitudinal direction of the exhaust passage 12. FIG. 3B shows a cross-sectional view of the EHC 13 along a line X1-X2 in FIG. 3A. As shown in FIGS. 3A and 3B, the EHC 13 includes an EHC carrier 13a, a retention mat 13b, a case 13c, a positive electrode 13d, a negative electrode 13e and insulators 13f and 13g.

The EHC carrier 13a has a honeycombed cross-section, and supports the catalyst. For example, the EHC carrier 13a is formed by SiC (silicon dioxide). The EHC carrier 13a has the conductive property. The EHC carrier 13a corresponds to an example of the catalyst carrier. A sensor which detects a floor temperature (hereinafter referred to as "EHC floor temperature") of the catalyst in the EHC 13 may be provided on the EHC carrier 13a.

The retention mat 13b is positioned to cover the outer periphery of the EHC carrier 13a and the inner periphery of the case 13c, and retains the EHC carrier 13a. The retention mat 13b is formed by interweaving the fibrous metallic oxide such as alumina, and has the electrical insulation property.

Additionally, the retention mat 13*b* has the thermal insulation property. The retention mat 13*b* corresponds to an example of the carrier retention unit. A sensor which detects a temperature (hereinafter referred to as "retention mat temperature") of the retention mat 13*b* may be provided on the retention mat 13*b*.

The case 13*c* is a chassis of the EHC 13 which is formed by the metallic material such as SUS. The case 13*c* is connected to the exhaust passage 12 via a connection member (which is not shown) at the upstream and downstream ends.

The positive electrode 13*d* is an electrode for applying the positive voltage, and the end of the positive electrode 13*d* is fixed on the periphery of the EHC carrier 13*a*. The negative electrode 13*e* is an electrode for applying the negative voltage, and the end of the negative electrode 13*e* is fixed on the periphery of the EHC carrier 13*a*. The positive electrode 13*d* and the negative electrode 13*e* are covered by the insulators 13*f* and 13*g* which are formed by the insulation material such as alumina, so as to maintain the electrically insulated condition.

As for the above EHC 13, when the positive voltage based on the potential of the negative electrode 13*e* is applied to the positive electrode 13*d*, the current flows through the EHC carrier 13*a* having the conductive material, and the EHC carrier 13*a* generates the heat. By the heat, the temperature of the catalyst supported by the EHC carrier 13*a* increases, and the catalyst immediately makes the transition to a catalyst activated state. The above configuration of the EHC 13 is an example. Various heretofore known manners can be applied to the configuration of the EHC carrier, the setting manner of each electrode and the control manner, for example.

Here, the above ECU 70 performs a control for warming the EHC 13 (namely, catalyst warming control). Concretely, the ECU 70 performs a control of heating the catalyst by applying the current to the EHC 13, or a control of heating the catalyst by the exhaust gas of the engine 1. Hereinafter, the control of heating the catalyst by applying the current to the EHC 13 is referred to as "catalyst warming by applying current", and the control of heating the catalyst by the exhaust gas of the engine 1 is referred to as "catalyst warming by engine". Specifically, when the EHC floor temperature is equal to or lower than a predetermined temperature, the ECU 70 performs the catalyst warming by applying the current or the catalyst warming by the engine 1, so as to maintain the EHC floor temperature equal to or higher than a temperature (namely, activating temperature) at which the catalyst in the EHC 13 exerts an optimum exhaust purification performance. Hereinafter, the predetermined temperature used for the determination of the EHC floor temperature is suitably referred to as "catalyst warming determination temperature". The catalyst warming determination temperature is set based on the activating temperature of the catalyst in the EHC 13. Basically, when the EHC floor temperature is equal to or lower than the catalyst warming determination temperature, the ECU 70 issues a request for applying the current to the EHC 13 for the purpose of the catalyst warming (hereinafter, the request is referred to as "request for applying current to EHC").

When the catalyst warming by applying the current is performed, the ECU 70 performs the control of making the hybrid vehicle 100 travel by using the output of the engine 1, for example. In contrast, when the catalyst warming by the engine 1 is performed, the ECU 70 performs the control of making the hybrid vehicle 100 travel by using the output of the motor generator MG, for example. Namely, a so-called "EV traveling" is performed. In this case, while the ECU 70 makes the engine 1 perform a driving corresponding to an idling driving, for example, the ECU 70 performs a control of delaying the ignition timing so as to increase the exhaust gas temperature.

Basic Concept in Embodiment

Next, a description will be given of a basic concept in the embodiment. In the embodiment, the retention mat 13*b* in the EHC 13 is forcibly cooled so that the insulation property of the RHC 13 is ensured.

Figure 4:
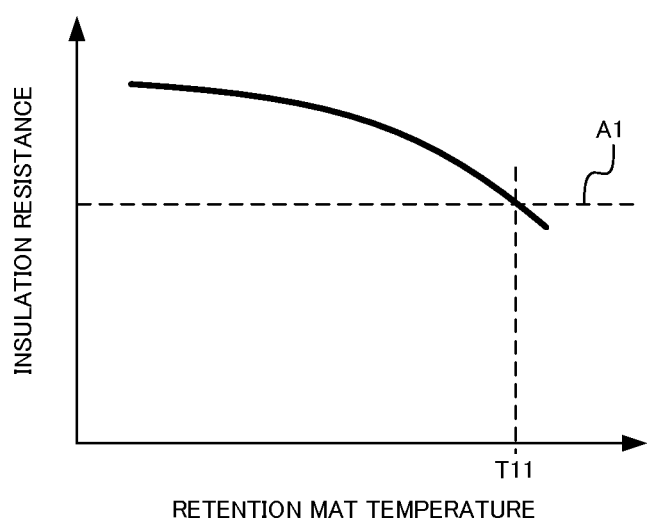
FIG. 4 shows an example of a relationship between a retention mat temperature and an insulation resistance of a retention mat.

A description will be given of a reason for cooling the retention mat 13*b*, with reference to FIG. 4. FIG. 4 shows an example of a relationship between the retention mat temperature and the insulation resistance of the retention mat 13*b*. In FIG. 4, a horizontal axis shows the retention mat temperature, and a vertical axis shows the insulation resistance (corresponding to a volume intrinsic resistivity). Here, "insulation resistance" is represented by a numerical value corresponding to an insulation property between electrical circuits or between an electrical circuit and earth. When the numerical value of the insulation resistance becomes lower, an electrical leak tends to occur.

As shown in FIG. 4, when the temperature becomes higher, the insulation resistance tends to decrease due to the property of the alumina of the retention mat 13*b*, for example. Therefore, during a high speed driving and a high load driving in which the exhaust gas becomes a high temperature, the insulation resistance of the retention mat 13*b* tends to decrease due to the high-temperature retention mat 13*b*. Additionally, when the retention mat temperature becomes higher than a temperature T11, the insulation resistance of the retention mat 13*b* becomes lower than a value shown by a reference numeral A1, and the insulation property of the retention mat 13*b* cannot be ensured. Therefore, when the retention mat temperature becomes higher than a temperature T11, it can be said that the current should not be applied to the EHC 13.

Hereinafter, the value of the insulation resistance shown by the reference numeral A1 is referred to as "insulation resistance lower limit ensured value". Additionally, the retention mat temperature T11 corresponding to the insulation resistance lower limit ensured value A1 is referred to as "insulation ensured temperature". For example, the insulation ensured temperature is set to a temperature which is higher than the catalyst warming determination temperature. As an example, the catalyst warming determination temperature is set to about 350 degrees Celsius, and the insulation ensured temperature is set to about 500 degrees Celsius.

Thus, in the embodiment, the retention mat temperature is decreased by forcibly cooling the retention mat 13*b*, in order to suppress the decrease in the insulation property of the retention mat 13*b* due to the high-temperature retention mat 13*b*. Concretely, in the embodiment, a cooling medium is used for cooling the retention mat 13*b*, and the cooling medium is flows on an outer periphery of the case 13*c* of the EHC 13 so as to release a heat of the retention mat 13*b* from an outside of the case 13*c*. For example, the retention mat 13*b* is forcibly cooled when the retention mat temperature is equal to or higher than the insulation ensured temperature, in order to decrease the retention mat temperature to a temperature lower than the insulation ensured temperature.

According to the embodiment, it is possible to prevent the retention mat temperature from becoming high. Therefore, it becomes possible to appropriately ensure the insulation property of the EHC 13. Namely, by maintaining the retention mat temperature at a lower temperature than the insulation ensured temperature, it becomes possible to maintain the insulation resistance of the retention mat 13*b* at a higher value than the insulation resistance lower limit ensured value. Hence, it becomes possible to expand a range of a condition in which the current can be applied to the EHC 13.

Hereinafter, a description will be given of concrete embodiments (first and second embodiments).

First Embodiment

In the first embodiment, an air is used as the cooling medium for forcibly cooling the retention mat 13b. Concretely, in the first embodiment, a cooler which flows the air (namely, headwind) on the outer periphery of the case 13c covering the retention mat 13b is used so as to forcibly cool the retention mat 13b. Hereinafter, cooling the retention mat 13b by the air is referred to as "air-cooling heat release".

(Configuration of Cooler)

A concrete description will be given of a configuration of the cooler 14 in the first embodiment, with reference to FIGS. 5A and 5B.

Figure 5A:
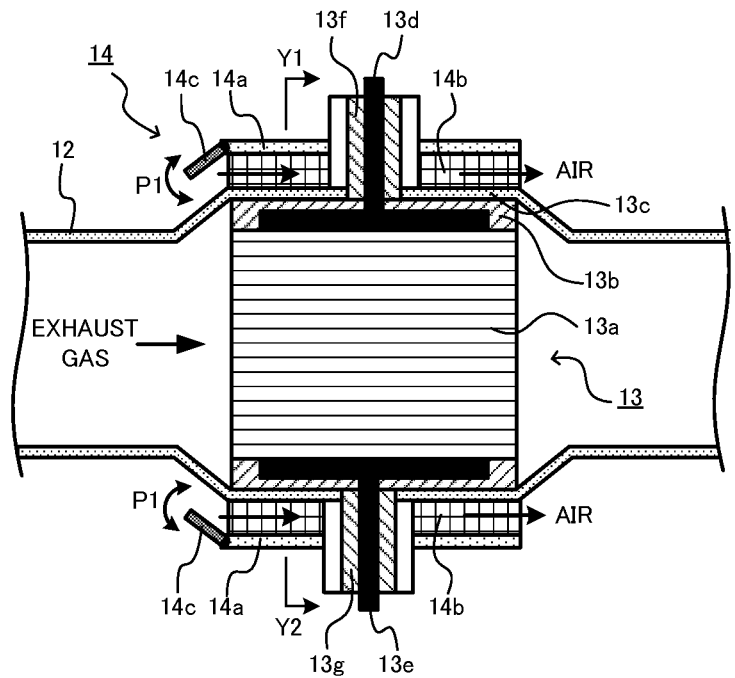
FIGS. 5A and 5B show schematic configurations of a cooler in a first embodiment.

FIG. 5A shows a cross-sectional view of the EHC 13 and the cooler 14 along a longitudinal direction of the exhaust passage 12. FIG. 5B shows a cross-sectional view of the EHC 13 and the cooler 14 along a line Y1-Y2 in FIG. 5A.

Figure 5B:
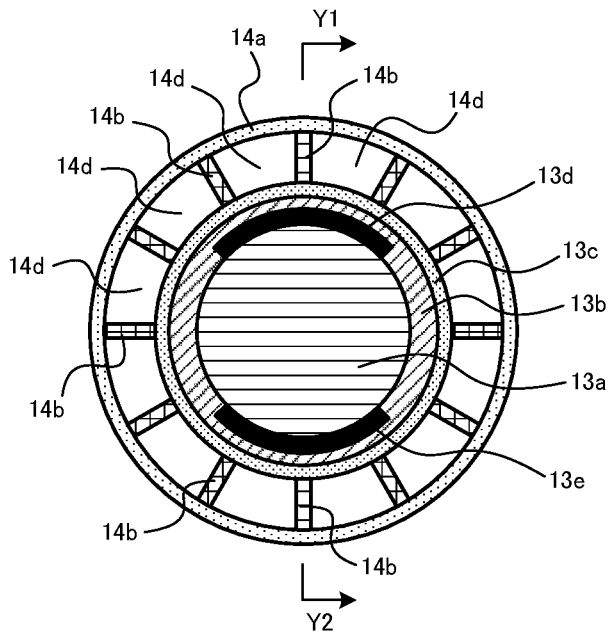

As shown in FIGS. 5A and 5B, the cooler 14 includes a cover 14a, fins 14b and a switching valve 14c. The cover 14a is provided on the outer periphery of the case 13c of the EHC 13 to cover the case 13c. The fins 14b are provided on the outer periphery of the case 13c to project from the case 13c to the cover 14a, and extend along the longitudinal direction of the EHC 13. Additionally, the fins 14b are radially arranged from the case 13c to the cover 14a. The fins 14b function as a heat release fin for releasing the heat of the EHC 13.

Spaces 14d between the outer periphery of the case 13c and the inner periphery of the cover 14a (specifically, between the plural fins 14b) form passages in which the air (headwind) flows. Hereinafter, the spaces 14d are referred to as "air passages 14d". The air passages 14d correspond to an example of the cooling medium passage.

The switching valve 14c is provided on an end of the cover 14a where the air flows in. Namely, the switching valve 14c is provided on air inlets of the air passages 14d. The switching valve 14c opens and closes as shown by an arrow P1. Then, the switching valve 14c switches between the flow and the cutoff of the air to the air passages 14d. The switching valve 14c is controlled by the ECU 70. The cooler 14 and the ECU 70 correspond to an example of the cooling unit in the invention. Additionally, the switching valve 14c and the ECU 70 correspond to an example of the flow amount controlling unit.

As an example, the switching valve 14c is provided on each of the air inlets of the plural air passages 14d formed between the fins 14b. Namely, the switching valve 14c is independently provided for each of the plural air inlets. As another example, the switching valve 14c is provided for each of two or more adjacent air inlets in the plural air inlets. Namely, one switching valve 14c switches between the flow and the cutoff of the air to two or more air passages 14d. The above configuration of the switching valve 14c is just one example. The publicly known valve which switches the flow and the cutoff of the fluid can be applied to the switching valve 14c.

According to the above cooler 14, by flowing the headwind to the outer periphery of the case 13c covering the retention mat 13b, it is possible to forcibly cool the retention mat 13b. Concretely, by using the plural fins 14b in the air passages 14d, it is possible to improve an effect of the air-cooling heat release by the headwind. Therefore, it becomes possible to prevent the retention mat temperature from becoming high. Additionally, according to the cooler 14, by using the cover 14a, it is possible to prevent an extreme air-cooling heat release. Therefore, it becomes possible to appropriately keep the EHC 13 warm. Furthermore, by using the switching valve 14c, it is possible to appropriately switch between the execution and the inexecution of the air-cooling heat release.

Figure 6:
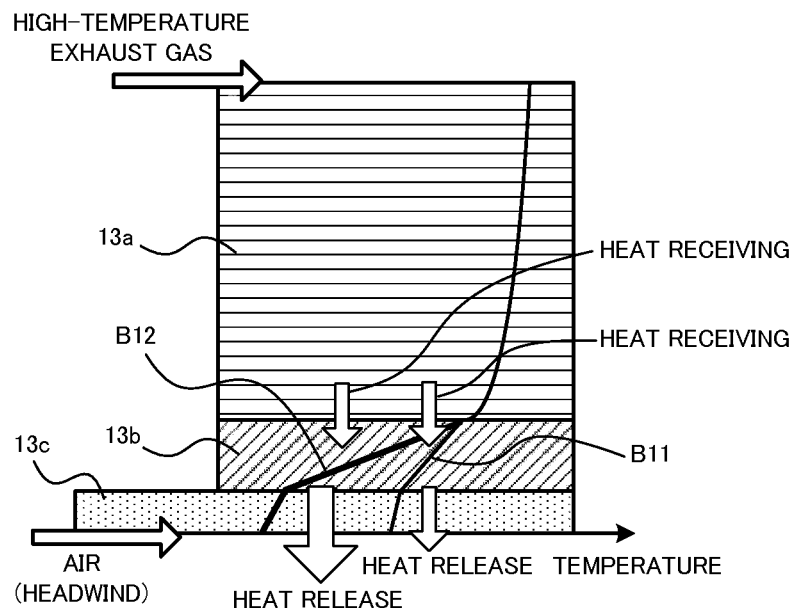
FIG. 6 shows a diagram for explaining an effect by a cooler in a first embodiment.

Here, a description will be given of an effect example of the cooler 14, with reference to FIG. 6. In FIG. 6, a horizontal direction shows a temperature, and a vertical direction shows the EHC carrier 13a, the retention mat 13b and the case 13c. Hence, FIG. 6 schematically represents the heat transfer in the EHC 13. Concretely, a graph B11 shows an example of a temperature profile in case of not performing the air-cooling heat release by the cooler 14 (in other words, in case of not applying the cooler 14 to the EHC 13). A graph B12 shows an example of a temperature profile in case of performing the air-cooling heat release by the cooler 14. As shown by the graphs B11 and B12, the retention mat 13b basically receives the heat from the EHC carrier 13a, and releases the heat to the case 13c.

According to the graphs B11 and B12, when the air-cooling heat release is performed, it can be understood that the heat of the retention mat 13b is significantly released compared with the case of not performing the air-cooling heat release. Namely, it can be understood that the retention mat temperature significantly decreases. This is caused by the operation of the plural fins 14b in the air passage 14d. Therefore, by performing the air-cooling heat release by the cooler 14 in the first embodiment, it can be said that it is possible to appropriately prevent the retention mat temperature from becoming high.

Next, a description will be given of two examples (hereinafter referred to as "first cooling control" and "second cooling control") related to a control method of the cooler 14 performed by the ECU 70. In the first and second cooling controls, the ECU 70 controls the switching valve 14c of the cooler 14. Namely, the ECU 70 controls the open and the close of the switching valve 14c so as to switch between the flow and the cutoff of the air to the air passage 14d.

(First Cooling Control)

In the first cooling control according to the first embodiment, when the EHC floor temperature is lower than a first predetermined temperature and the retention mat temperature is equal to or higher than a second predetermined temperature, the ECU 70 performs the air-cooling heat release by the cooler 14. In this case, the ECU 70 performs the control for setting the switching valve 14c to the open state so that the air flows in the air passage 14d. Meanwhile, when the EHC floor temperature is equal to or higher than the first predetermined temperature or the retention mat temperature is lower than the second predetermined temperature, the ECU 70 does not perform the air-cooling heat release by the cooler 14. In this case, the ECU 70 performs the control for setting the switching valve 14c to the close state so that the air does not flow in the air passage 14d. Hereinafter, performing the air-cooling heat release by the cooler 14 is referred to as "air-cooling heat release on", and not performing the air-cooling heat release by the cooler 14 is referred to as "air-cooling heat release off".

Figure 7:
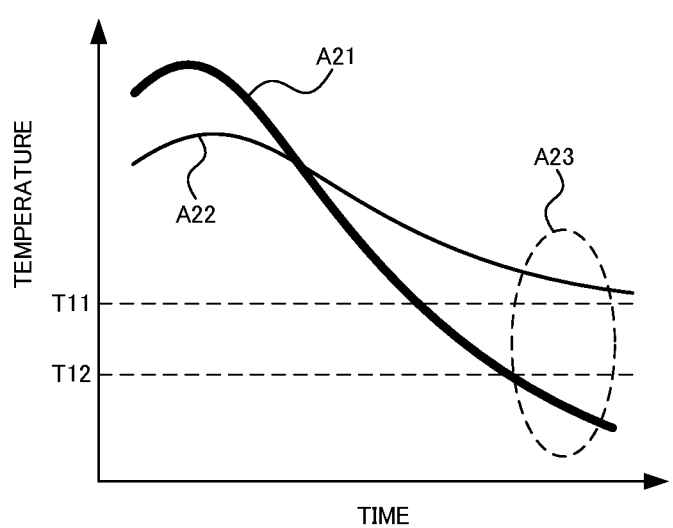
FIG. 7 shows a diagram for explaining a reason for performing a first cooling control.

A description will be given of a reason for performing the above first cooling control, with reference to FIG. 7. FIG. 7 shows an example of a temperature profile of the EHC floor temperature and the retention mat temperature. In FIG. 7, a horizontal axis shows time, and a vertical axis shows a temperature. A graph A21 shows a time change of the EHC floor temperature, and a graph A22 shows a time change of the retention mat temperature. As shown by the graphs A21 and A22, it can be understood that both the EHC floor temperature and the retention mat temperature significantly decrease. For example, during a deceleration F/C (fuel cut), the above decreases in the EHC floor temperature and the retention mat temperature occur. In this case, it can be understood that the thermal difference between the EHC floor temperature and the retention mat temperature occurs. This is caused by a heat transfer at a boundary between the EHC carrier 13a and the retention mat 13b and a heat conduction in the retention mat 13b. Additionally, it can be understood that the change of the retention mat temperature is slower than the change of the EHC floor temperature. In other words, a time constant of the retention mat temperature is larger than that of the EHC floor temperature. This is caused by a heat capacity of each component in the EHC 13.

Additionally, in FIG. 7, a temperature T12 indicates the catalyst warming determination temperature, and a temperature T11 indicates the insulation ensured temperature. In this case, as shown by an area A23 represented by a broken line, it can be understood that such a state that the EHC floor temperature is lower than the catalyst warming determination temperature T12 and the retention mat temperature is higher than the insulation ensured temperature T11 occurs. In the state, though the EHC floor temperature is lower than the catalyst warming determination temperature T12 and the request for applying the current to the EHC 13 is issued, since the retention mat temperature is higher than the insulation ensured temperature T11, it can be said that the current should not be applied to the EHC 13 from the view point of the insulation property of the EHC 13. Therefore, in the state, it is preferable to perform the air-cooling heat release by the cooler 14 in order to ensure the insulation property of the retention mat 13b by decreasing the retention mat temperature.

Here, though the insulation property of the retention mat 13b can be ensured when the air-cooling heat release by the cooler 14 is constantly performed, there is possibility that the catalyst in the EHC 13 is excessively cooled. Namely, there is possibility that the catalyst warmed state is not maintained. For example, when the air-cooling heat release is performed for the purpose of only ensuring the insulation property without regard for the catalyst warming, there is possibility that the catalyst makes the transition from the activated state to the no-activated state by the excess cooling of the catalyst.

Thus, in the first cooling control, the ECU 70 performs the air-cooling heat release by the cooler 14 in consideration of both the catalyst warming and the insulation property. Concretely, only when the current should be applied to the EHC 13 (in other words, the catalyst warming should be performed) and the insulation property of the retention mat 13b can not be ensured, the ECU 70 performs the air-cooling heat release by the cooler 14. Namely, only in the state shown by the area A23 in FIG. 7, the ECU 70 performs the air-cooling heat release. In other words, even when the insulation property of the retention mat 13b can not be ensured, the ECU 70 does not perform the air-cooling heat release by the cooler 14 when the current should not be applied to the EHC 13.

Specifically, the ECU 70 determines whether or not the current should be applied to the EHC 13 by using the first predetermined temperature set based on the catalyst warming determination temperature, and determines whether or not the insulation property of the retention mat 13b can not be ensured by using the second predetermined temperature set based on the insulation ensured temperature. Then, when the EHC floor temperature is lower than the first predetermined temperature and the retention mat temperature is equal to or higher than the second predetermined temperature, the ECU 70 performs the air-cooling heat release by the cooler 14. Meanwhile, when the EHC floor temperature is equal to or higher than the first predetermined temperature or the retention mat temperature is lower than the second predetermined temperature, the ECU 70 does not perform the air-cooling heat release by the cooler 14.

Figure 8:
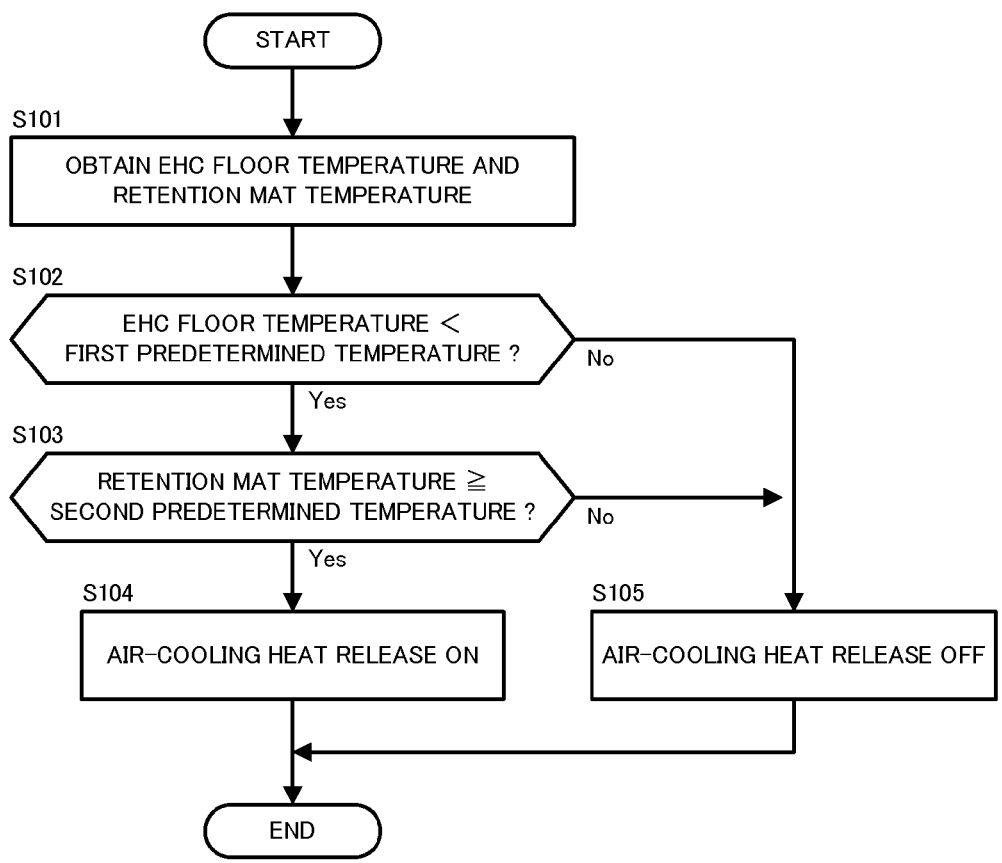
FIG. 8 is a flow chart showing a first cooling control process in a first embodiment.

Next, a description will be given of a concrete process related to the first cooling control, with reference to FIG. 8. FIG. 8 is a flow chart showing a first cooling control process in the first embodiment. The process is repeatedly executed by the ECU 70 in a predetermined cycle.

First, in step S101, the EUC 70 obtains the EHC floor temperature and the retention mat temperature. Concretely, the ECU 70 obtains the EHC floor temperature detected by the sensor provided on the EHC carrier 13a, and obtains the retention mat temperature detected by the sensor provided on the retention mat 13b. Then, the process goes to step S102.

It is not limited to use the EHC floor temperature and the retention mat temperature which are detected by the above sensors. The EHC floor temperature and the retention mat temperature which are estimated by a predetermined parameter may be used. Namely, instead of actual measurement values, estimated values maybe used as the EHC floor temperature and the retention mat temperature.

In step S102, the ECU 70 determines whether or not the EHC floor temperature is lower than the first predetermined temperature. The ECU 70 determines whether or not the catalyst warming should be performed, based on the EHC floor temperature. In other words, the ECU 70 determines whether or not the current should be applied to the EHC 13. The first predetermined temperature used by the determination is set based on the catalyst warming determination temperature. As an example, the first predetermined temperature is set to the catalyst warming determination temperature. As another example, the first predetermined temperature is set to a temperature which is higher than the catalyst warming determination temperature to some extent. For example, the first predetermined temperature is set to about 400 degrees Celsius.

When the EHC floor temperature is lower than the first predetermined temperature (step S102: Yes), the process goes to step S103. In contrast, when the EHC floor temperature is equal to or higher than the first predetermined temperature (step S102: No), the process goes to step S105. In step S105, the ECU 70 does not perform the air-cooling heat release in order to prevent the heat release from the catalyst (namely, in order to ensure the catalyst warming). Concretely, the ECU 70 performs the control for setting the switching valve 14c to the close state so that the air does not flow in the air passage 14d. Then, the process ends.

In step S103, the ECU 70 determines whether or not the retention mat temperature is equal to or higher than the second predetermined temperature. The ECU 70 determines whether or not the insulation property of the retention mat 13b decreases, based on the retention mat temperature. Namely, the ECU 70 determines whether or not the insulation property of the retention mat 13b can not be ensured. The second predetermined temperature used by the determination is set based on the insulation ensured temperature. As an example, the second predetermined temperature is set to the insulation ensured temperature. As another example, the second predetermined temperature is set to a temperature which is higher than the insulation ensured temperature to some extent. For example, the second predetermined temperature is set to about 600 degrees Celsius.

The insulation ensured temperature is set based on a relationship (see FIG. 4) between the retention mat temperature and the insulation property preliminarily obtained by an measurement, for example. Namely, the insulation ensured temperature is set to a temperature corresponding to the insulation resistance lower limit ensured value obtained by the relationship.

When the retention mat temperature is equal to or higher than the second predetermined temperature (step S103: Yes), the process goes to step S104. This case corresponds to such a state that the EHC floor temperature is lower than the first predetermined temperature and that the retention mat temperature is equal to or higher than the second predetermined temperature. Namely, this state corresponds to such a state that the current should be applied to the EHC 13 and that the insulation property of the retention mat 13b can not be ensured. Therefore, the ECU 70 performs the air-cooling heat release so that the retention mat temperature decreases, in order to ensure the insulation property of the retention mat 13b. Concretely, the ECU 70 performs the control for setting the switching valve 14c to the open state so that the air flows in the air passage 14d. Then, the process ends.

Meanwhile, when the retention mat temperature is lower than the second predetermined temperature (step S103: No), the process goes to step S105. In this case, since the insulation property of the retention mat 13b is ensured, it can be said that it is not necessary to decrease the retention mat temperature. So, the ECU 70 does not perform the air-cooling heat release (step S105). Then, the process ends.

According to the above first cooling control, in consideration of both the catalyst warming and the insulation property, it is possible to appropriately switch the air-cooling heat release on and off. Concretely, it is possible to appropriately prevent the excess cooling of the catalyst due to the execution of the air-cooling heat release. Namely, it is possible to appropriately prevent the heat of the catalyst from being released during the catalyst warming.

(Second Cooling Control)

Next, a description will be given of the second cooling control in the first embodiment. In the second cooling control, the ECU 70 performs the air-cooling heat release when the retention mat temperature is equal to or higher than a third predetermined temperature. Concretely, the second cooling control is different from the first cooling control in that, even when the EHC floor temperature is equal to or higher than the first predetermined temperature, the ECU 70 performs the air-cooling heat release when the retention mat temperature is equal to or higher than a third predetermined temperature.

Figure 9A:
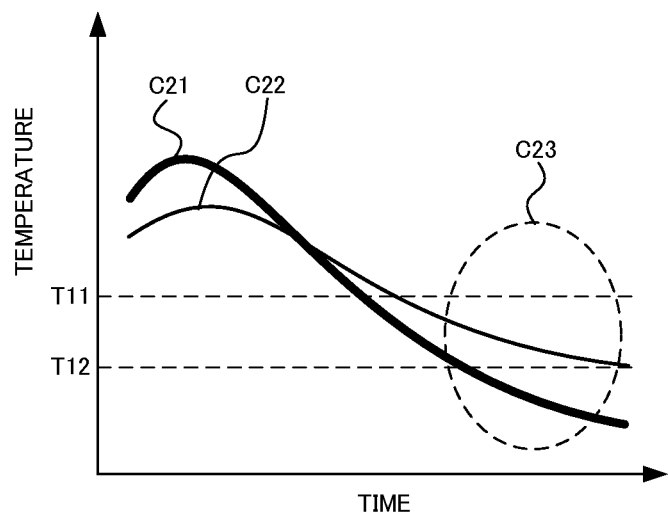
FIGS. 9A and 9B show diagrams for explaining a reason for performing a second cooling control.
Figure 9B:
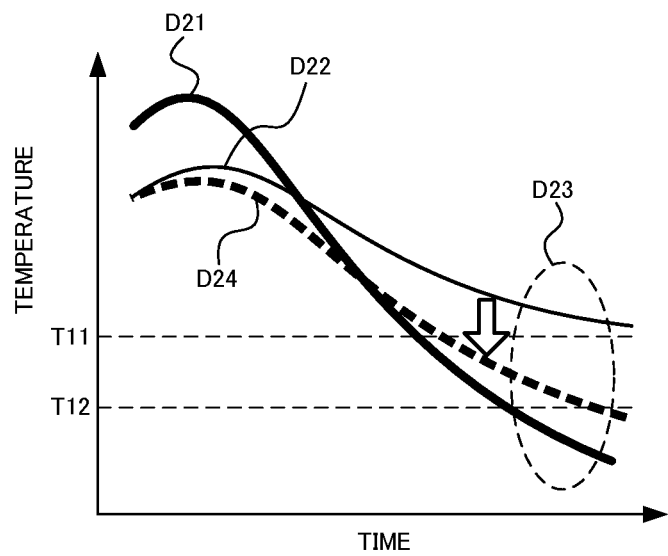

A description will be given of a reason for performing the above second cooling control, with reference to FIGS. 9A and 9B. In FIGS. 9A and 9B, a horizontal axis shows time, and a vertical axis shows a temperature. FIGS. 9A and 9B show examples of temperature profiles of the EHC floor temperature and the retention mat temperature. Graphs C21 and D21 show time changes of the EHC floor temperature, and graphs C22 and D22 show time changes of the retention mat temperature. Additionally, FIG. 9A shows the temperature profiles when the deceleration F/C is performed during a low speed driving and/or a low load driving, and FIG. 9B shows the temperature profiles when the deceleration F/C is performed during a high speed driving and/or a high load driving. As shown in the graphs C21 and D21 and the graphs C22 and D22, basically, both the EHC floor temperature and the retention mat temperature significantly decrease when the deceleration F/C is performed.

As shown by an area c23 in FIG. 9A, when the deceleration F/C is performed during the low load driving, it can be understood that the retention mat temperature is lower than the insulation ensured temperature T11 when the EHC floor temperature is lower than the catalyst warming determination temperature T12. In this case, the request for applying the current to the EHC 13 is issued when the EHC floor temperature is lower than the catalyst warming determination temperature T12. However, since the retention mat temperature is lower than the insulation ensured temperature T11, it can be said that the current can be applied to the EHC 13 without performing the air-cooling heat release.

Meanwhile, as shown by an area D23 in FIG. 9B, when the deceleration F/C is performed during the high load driving, it can be understood that the retention mat temperature is higher than the insulation ensured temperature T11 when the EHC floor temperature is lower than the catalyst warming determination temperature T12. The above state tends to occur when the deceleration F/C is performed in such a state that the retention mat temperature is constantly higher than the insulation ensured temperature T11 caused by a significant high temperature (for example, more than 800 degrees Celsius) of the EHC 13 itself due to the high speed driving and/or the high load driving. Specifically, it is thought that the said state occurs caused by such a state that the retention mat temperature is higher than the EHC floor temperature and the difference between the retention mat temperature and the EHC floor temperature is a lot.

Though the request for applying the current to the EHC 13 is issued when the EHC floor temperature is lower than the catalyst warming determination temperature T12 and the retention mat temperature is higher than the insulation ensured temperature T11, it can be said that the current should not be applied to the EHC 13. In this case, it can be said that the air-cooling heat release should be performed so that the insulation property of the retention mat 13b is ensured, before the current is applied to the EHC 13. Concretely, until the insulation property of the retention mat 13b is ensured by the air-cooling heat release (in other words, until the retention mat temperature becomes equal to or lower than the insulation ensured temperature T11), it can be said that the applying the current to the EHC 13 should be waited.

Thus, the second cooling control is performed in order to preliminarily prevent such a state that the EHC floor temperature is equal to or lower than the catalyst warming determination temperature T12 and that the retention mat temperature is higher than the insulation ensured temperature T11 from occurring. Concretely, in the second cooling control, the ECU 70 preliminarily performs the air-cooling heat release by the cooler 14 in order to ensure such a state that the current can be applied to the EHC 13 after the deceleration F/C. In this case, the ECU 70 uses the third predetermined temperature which is at least higher than the second predetermined temperature (in other words, which is at least higher than the insulation ensured temperature), as the determination temperature, and performs the air-cooling heat release when the retention mat temperature is equal to or higher than the third predetermined temperature. Namely, even when the EHC floor temperature is equal to or higher than the first predetermined temperature, the ECU 70 performs the air-cooling heat release when the retention mat temperature is equal to or higher than the third predetermined temperature. In other words, when the retention mat temperature is equal to or higher than the third predetermined temperature, the ECU 70 performs the air-cooling heat release before the EHC floor temperature decreases to a temperature which is lower than the first predetermined temperature.

When the above second cooling control is performed, the retention mat temperature changes as shown by a graph D24 in FIG. 9B. According to the graph D24, when the EHC floor temperature becomes lower than the catalyst warming determination temperature T12, it can be understood that the retention mat temperature is maintained at a temperature which is lower than the insulation ensured temperature T11. Therefore, it becomes possible to start applying the current to the EHC 13 when the EHC floor temperature decreases to the catalyst warming determination temperature T12. Namely, unlike the case of not performing the second cooling control (see the graph D22), it can be said that it is not necessary to wait the applying the current to the EHC 13 until the insulation property of the retention mat 13b is ensured.

Figure 10:
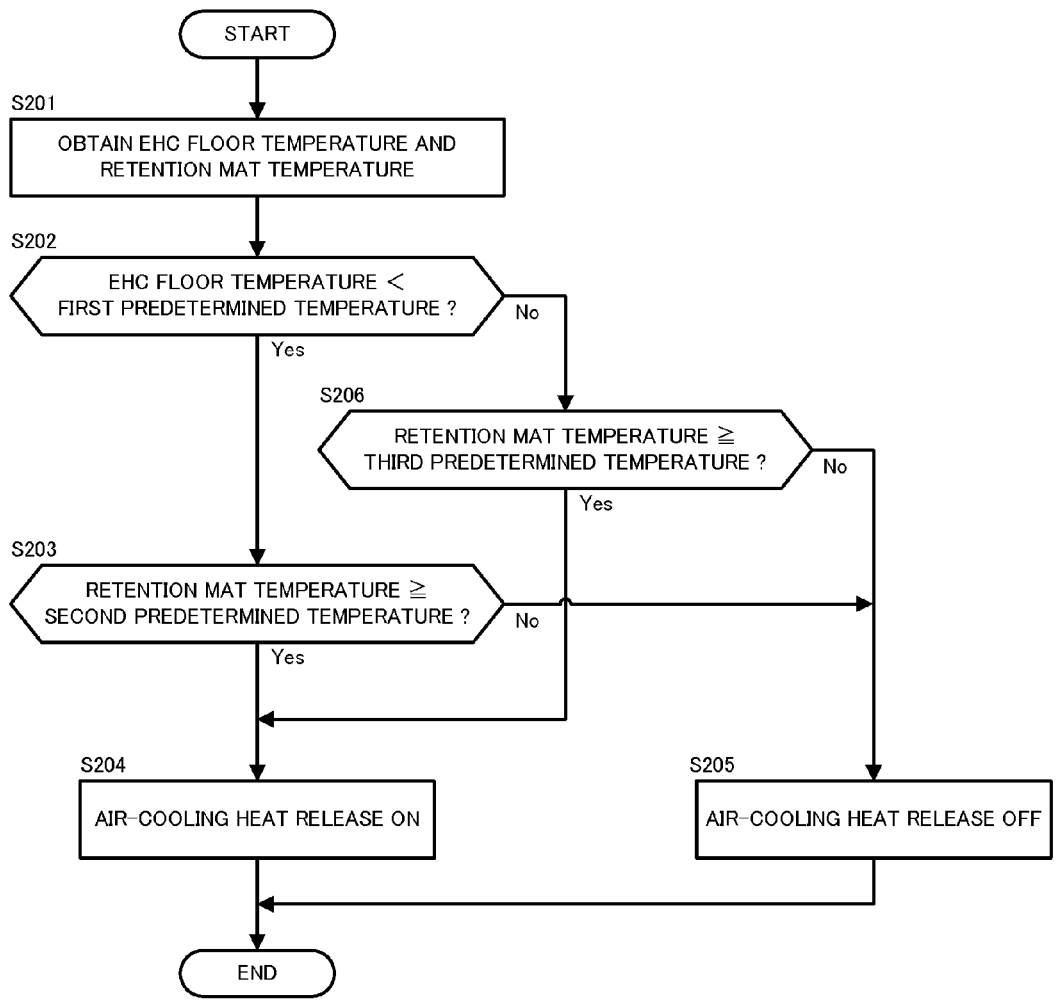
FIG. 10 is a flow chart showing a second cooling control process in a first embodiment.

Next, a description will be given of a concrete process related to the second cooling control, with reference to FIG. 10. FIG. 10 is a flow chart showing a second cooling control process in the first embodiment. The process is repeatedly executed by the ECU 70 in a predetermined cycle.

Since processes in steps S201 to S205 are similar to the processes in steps S101 to S105 (see FIG. 8), explanations thereof are omitted. Here, a description will be given of processes in step S206.

The process in step S206 is performed when the EHC floor temperature is equal to or higher than the first predetermined temperature (step S202: No). In step S206, the ECU 70 determines whether or not the retention mat temperature is equal to or higher than the third predetermined temperature. The ECU 70 determines whether or not the air-cooling heat release should be preliminarily performed based on the retention mat temperature. In other words, the ECU 70 determines whether or not the extreme increase in the retention mat temperature occurs. The third predetermined temperature used by the determination is set to a temperature which is at least higher than the second predetermined temperature (in other words, which is at least higher than the insulation ensured temperature). For example, the third predetermined temperature is set to about 800 degrees Celsius.

When the retention mat temperature is equal to or higher than the third predetermined temperature (step S206: Yes), the process goes to step S204. In step S204, the ECU 70 performs the air-cooling heat release in order to prevent the extreme increase in the retention mat temperature. Namely, the ECU 70 preliminarily performs the air-cooling heat release by the cooler 14 in order to ensure such a state that the current can be applied to the EHC 13 after the deceleration F/C. Then, the process ends.

Meanwhile, when the retention mat temperature is lower than the third predetermined temperature (step S206: No), the process goes to step S205. In this case, since it is not necessary to preliminarily perform the air-cooling heat release by the cooler 14, the ECU 70 does not perform the air-cooling heat release (step S205). Then, the process ends.

According to the above second cooling control, by preliminarily performing the air-cooling heat release by the cooler 14, it becomes possible to appropriately ensure such a state that the current can be applied to the EHC 13 after the deceleration F/C. In other words, it becomes possible to expand the range of the condition in which the current can be applied to the EHC 13.

There is a tendency that the temperatures of the components (for example, the positive electrode 13d and/or the negative electrode 13e) in the EHC 13 become high during the high speed driving and/or the high load driving. However, according to the second cooling control, since the air-cooling heat release is performed during the high speed driving and/or the high load driving, it becomes possible to appropriately prevent the temperatures of the components in the EHC 13 from becoming high. Therefore, it becomes possible to improve a durability of the components in the EHC 13.

While the above embodiment shows such an example that the air-cooling control heat release is preliminarily performed when the EHC floor temperature is equal to or higher than the first predetermined temperature and the retention mat temperature is equal to or higher than the third predetermined temperature, it is not limited to use the first predetermined temperature as the determination temperature for determining the EHC floor temperature. Namely, a determination temperature different from the first predetermined temperature maybe used, and the air-cooling control heat release may be preliminarily performed when the EHC floor temperature is equal to or higher than the said determination temperature and the retention mat temperature is equal to or higher than the third predetermined temperature. For example, a temperature which is higher than the first predetermined temperature can be used as the said determination temperature.

While the above embodiment shows such an example that the ECU 70 controls the open and the close of the switching calve 14c so as to switch the air-cooling heat release on and off, it is not limited to this. As another example, the ECU 70 can control an opening degree of the switching valve 14c so as to perform the first and second cooling controls. Concretely, in such a case that the said example is applied to the first cooling control, the ECU 70 can set the opening degree of the switching valve 14c to the open side, when the EHC floor temperature is equal to or higher than the first predetermined temperature and the retention mat temperature is equal to or higher than the second predetermined temperature. Additionally, the ECU 70 can set the opening degree of the switching valve 14c to the close side, when the EHC floor temperature is lower than the first predetermined temperature or the retention mat temperature is lower than the second predetermined temperature. Meanwhile, in such a case that said example is applied to the second cooling control, the ECU 70 can set the opening degree of the switching valve 14c to the open side, when the retention mat temperature is equal to or higher than the third predetermined temperature.

Second Embodiment

Next, a description will be given of a second embodiment. The second embodiment is different from the first embodiment in that cooling water for cooling the engine 1 is used as the cooling medium for forcibly cooling the retention mat 13b. Concretely, the second embodiment uses a cooler which flows the cooling water on the outer periphery of the case 13c covering the retention mat 13b so as to forcibly cooling the retention mat 13b. Hereinafter, cooling the retention mat 13b by the cooling water is referred to as "water-cooling heat release".

(Configuration of Cooler)

A concrete description will be given of a configuration of the cooler 15 in the second embodiment, with reference to FIGS. 11A and 11B.

Figure 11A:
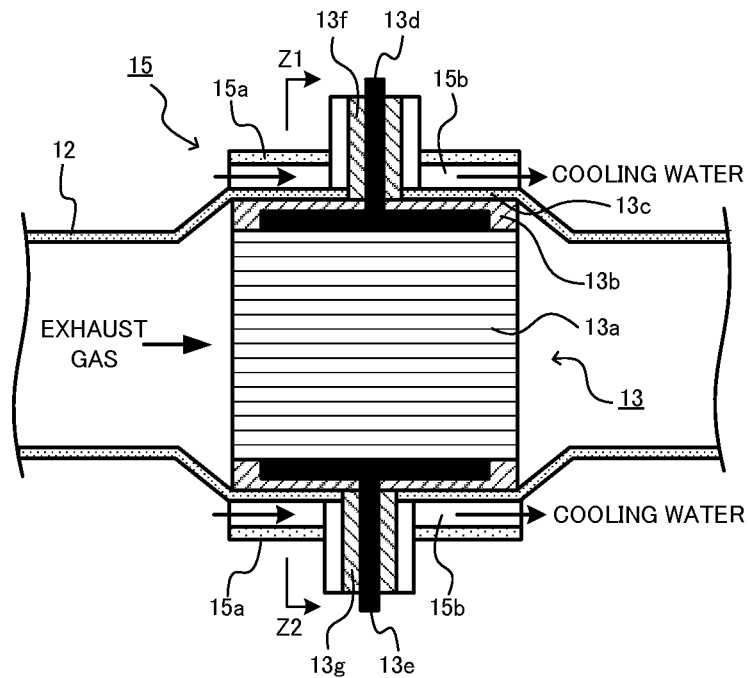
FIGS. 11A and 11B show schematic configurations of a cooler in a second embodiment.

FIG. 11A shows a cross-sectional view of the EHC 13 and the cooler 15 along a longitudinal direction of the exhaust passage 12. FIG. 11B shows a cross-sectional view of the EHC 13 and the cooler 15 along a line Z1-Z2 in FIG. 11A.

Figure 11B:
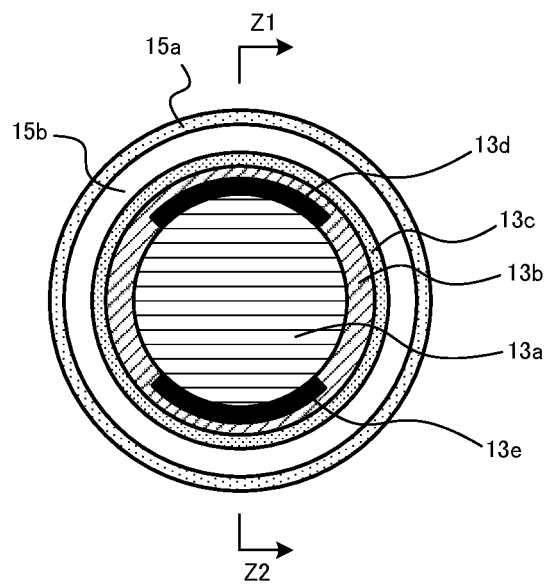

As shown in FIGS. 11A and 11B, the cooler 15 mainly includes a cover 15a. The cover 15a is provided on the outside of the case 13c of the EHC 13 to cover the outer periphery of the case 13c. A space 15b between the outer periphery of the case 13c and the inner periphery of the cover 15a forms a passage in which the cooling water flows. Hereinafter, the space 15b is referred to as "cooling water passage 15b". The cover 15a forms an outer peripheral wall of the cooling water passage 15b. Namely, the cover 15a forms the outer peripheral wall of the pipe in which the cooling water flows. The cooling water passage 15b corresponds to an example of the cooling medium passage.

The cooling water passage 15b is connected to a publicly known cooling system (which is not shown in FIGS. 11A and 11B) for cooling the engine 1 used by the cooling water. Namely, the cooling water passage 15b is supplied with the cooling water for cooling the engine 1. Additionally, a flow amount of the cooling water in the cooling water passage 15b is controlled by an electric water pump (hereinafter referred to as "electric WP") in the cooling system. The electric WP is formed by an electric motor, and circulates the cooling water in the cooling water passage by a driving of the motor. Additionally, the electric WP is controlled by the ECU 70. Namely, the flow amount of the cooling water in the cooling water passage 15b is controlled by the ECU 70 via the electric WP. Concretely, the ECU 70 controls the electric WP so as to increase or decrease the flow amount of the cooling water in the cooling water passage 15b.

The cooler 15 (including the electric WP) and the ECU 70 correspond to an example of the cooling unit in the invention. Additionally, the electric WP and the ECU 70 correspond to an example of the flow amount controlling unit.

According to the above cooler 15, by flowing the cooling water on the outer periphery of the case 13c covering the retention mat 13b, it is possible to appropriately forcibly cool the retention mat 13b. Therefore, it becomes possible to prevent the retention mat temperature from becoming high.

As for the cooler 15 in the second embodiment, the plural fins may be provided in the cooling water passage 15b like the first embodiment, too. Namely, the plural fins which project from the case 13c to the cover 15a and extend along the longitudinal direction of the EHC 13 may be provided on the outer periphery of the case 13c. Therefore, it is possible to improve an effect of the water-cooling heat release by the cooling water.

Hereinafter, a description will be given of two examples related to a control method of the cooler 15 performed by the ECU 70. A basic manner of the said control method is similar to the above first and second cooling controls in the first embodiment. Hence, the two examples related to the control method of the cooler 15 performed by the ECU 70 are referred to as "first cooling control" and "second cooling control", too.

As for the first and second cooling controls in the second embodiment, the ECU 70 controls the electric WP. Namely, the ECU 70 controls the electric WP so as to increase or decrease the cooling water flow amount in the cooling water passage 15b.

(First Cooling Control)

Basically, the first cooling control in the second embodiment is performed in accordance with a view point similar to the first cooling control in the first embodiment. Namely, in consideration of both the catalyst warming and the insulation property, the water-cooling heat release by the cooler 15 is performed. Concretely, only when the current should be applied to the EHC 13 and the insulation property of the retention mat 13b cannot be ensured, the ECU 70 performs the water-cooling heat release by the cooler 15. Specifically, when the EHC floor temperature is lower than the first predetermined temperature and the retention mat temperature is equal to or higher than the second predetermined temperature, the ECU 70 performs the water-cooling heat release by the cooler 15. In this case, the ECU 70 controls the electric WP so as to increase the cooling water flow amount. In contrast, when the EHC floor temperature is equal to or higher than the first predetermined temperature or the retention mat temperature is lower than the second predetermined temperature, the ECU 70 does not perform the water-cooling heat release by the cooler 15. In this case, the ECU 70 controls the electric WP so as to decrease the cooling water flow amount.

Meanwhile, in the second embodiment, when such a condition that the cooling water boils is satisfied (in other words, when there is a possibility that the cooling water boils), the ECU 70 controls the electric WP so as to increase the cooling water flow amount. Concretely, even when the EHC floor temperature is equal to or higher than the first predetermined temperature or the retention mat temperature is lower than the second predetermined temperature, the ECU 70 increases the cooling water flow amount when such a condition that the cooling water boils is satisfied, in order to prevent the boil of the cooling water.

Figure 12:
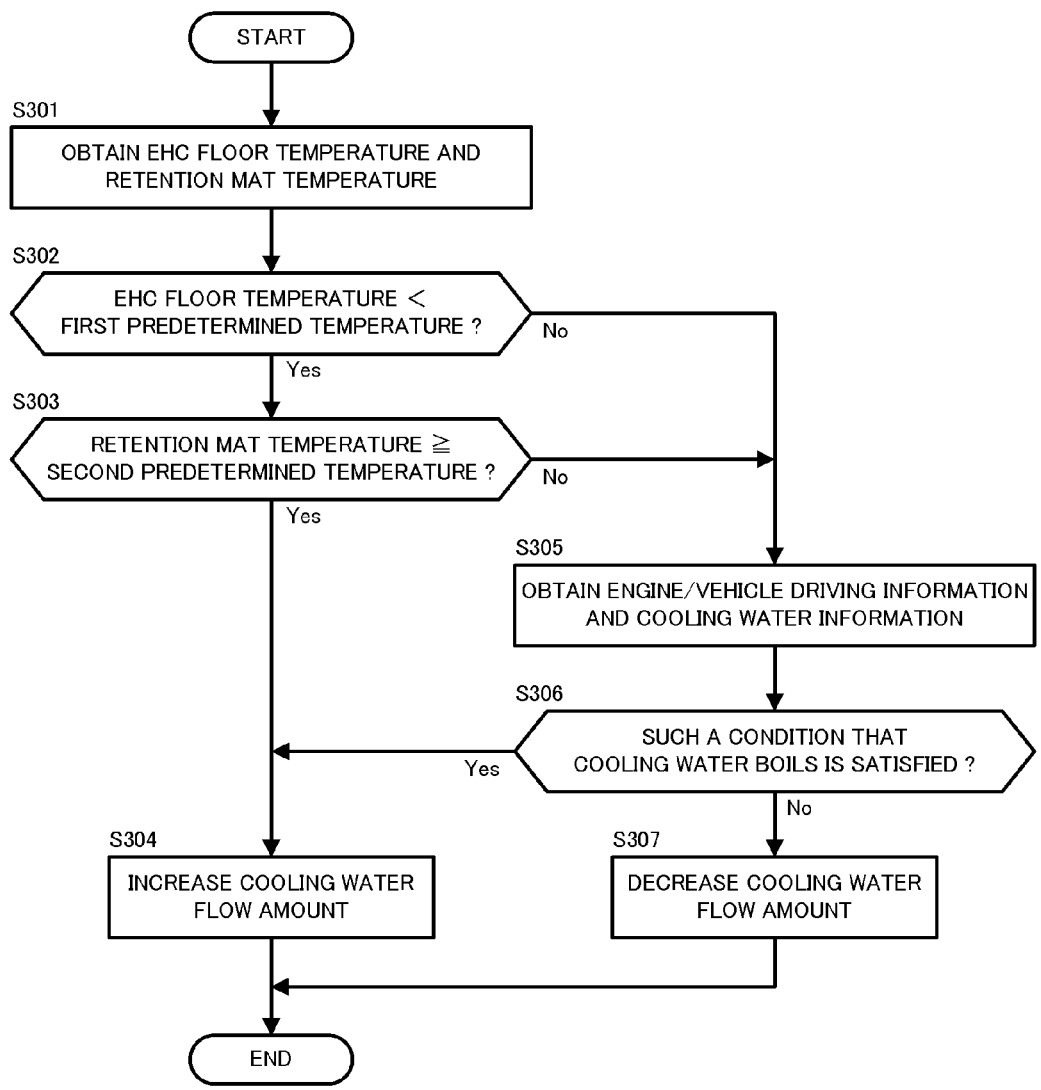
FIG. 12 is a flow chart showing a first cooling control process in a second embodiment.

Next, a description will be given of a concrete process related to the first cooling control, with reference to FIG. 12. FIG. 12 is a flow chart showing a first cooling control process in the second embodiment. The process is repeatedly executed by the ECU 70 in a predetermined cycle. In addition, the process is executed after the hybrid vehicle 100 starts and the electric WP starts driving in order to circulate the cooling water.

Since processes in steps S301 to S303 are similar to the processes in steps S101 to S103 (see FIG. 8), explanations thereof are omitted. Here, a description will be given of processes in steps S304 to S307.

When the retention mat temperature is equal to or higher than the second predetermined temperature (step S303: Yes), the process in step S304 is performed. In step S304, since the EHC floor temperature is lower than the first predetermined temperature and the retention mat temperature is equal to or higher than the second predetermined temperature, the ECU 70 increases the cooling water flow amount so that the retention mat temperature decreases, in order to ensure the insulation property of the retention mat 13b. For example, the ECU 70 controls the electric WP so that the cooling water flow amount becomes larger than when the EHC floor temperature is equal to or higher than the first predetermined temperature or the retention mat temperature is lower than the second predetermined temperature. Then, the process ends.

When the EHC floor temperature is equal to or higher than the first predetermined temperature (step S302: No), or when the retention mat temperature is lower than the second predetermined temperature (step S303: No), the process in step S305 is performed. In step S305, the ECU 70 obtains engine driving information, vehicle driving information and cooling water information in order to determine whether or not such a condition that the cooling water boils is satisfied in the latter process. For example, the ECU 70 obtains the engine water temperature detected by the water temperature sensor 206 and the cooling water flow amount (corresponding to a command value for the electric WP), as the cooling water information. Then, the process goes to step S306.

In step S306, based on the information obtained in step S305, the ECU 70 determines whether or not such a condition that the cooling water boils is satisfied (namely, the ECU 70 determines whether or not there is a possibility that the cooling water boils). In step S306, based on the engine driving information, the vehicle driving information and the cooling water information, the ECU 70 predicts the boil of the cooling water before the cooling water actually boils.

When such a condition that the cooling water boils is satisfied (step S306: Yes), the process goes to step S304. In step S304, the ECU 70 increases the cooling water flow amount in order to prevent the boil of the cooling water. Namely, by circulating the increased cooling water in the cooling water passage, the occurrence of the boil of the cooling water is prevented. Concretely, the ECU 70 controls the electric WP so that the cooling water flow amount becomes larger than when such a condition that the cooling water boils is not satisfied. Then, the process ends.

The cooling water flow amount which is increased when such a condition that the cooling water boils is satisfied may be the same as or different from the cooling water flow amount which is increased when the EHC floor temperature is lower than the first predetermined temperature and the retention mat temperature is equal to or higher than the second predetermined temperature. For example, when the EHC floor temperature is lower than the first predetermined temperature and the retention mat temperature is equal to or higher than the second predetermined temperature, the ECU 70 determines the increased flow amount in accordance with a degree of the decrease in the retention mat temperature. In contrast, when such a condition that the cooling water boils is satisfied, the ECU 70 determines the increased flow amount so that the boil of the cooling water is prevented, based on the engine driving information, the vehicle driving information and the cooling water information, for example.

Meanwhile, when such a condition that the cooling water boils is not satisfied (step S306: No), the process goes to step S307. In step S307, since it is not necessary to prevent the boil of the cooling water and to ensure the insulation property of the retention mat 13b, the ECU 70 decreases the cooling water flow amount. For example, the ECU 70 controls the electric WP so that the cooling water flow amount becomes smaller than when such a condition that the cooling water boils is satisfied, or when the EHC floor temperature is lower than the first predetermined temperature and the retention mat temperature is equal to or higher than the second predetermined temperature. Then, the process ends.

According to the above first cooling control in the second embodiment, in consideration of both the catalyst warming and the insulation property, it is possible to appropriately control the cooling water flow amount of the cooler 15. Additionally, it is possible to appropriately prevent the boil of the cooling water.

The first and second predetermined temperatures of the second embodiment may be the same as or different from those of the first embodiment. When different temperatures are used, the first and second predetermined temperatures used in the first and second embodiments can be set, respectively, in consideration of a difference of a cooling effect between the air-cooling heat release and the water-cooling heat release, for example.

(Second Cooling Control)

Next, a description will be given of the second cooling control in the second embodiment. The second cooling control in the second embodiment is performed in accordance with a view point similar to the second cooling control in the first embodiment, too. Namely, in the second embodiment, the water-cooling heat release by the cooler 15 is preliminarily performed in order to ensure such a state that the current can be applied to the EHC 13 after the deceleration F/C. Concretely, when the retention mat temperature is equal to or higher than the third predetermined temperature, the ECU 70 preliminarily increases the cooling water flow amount. In other words, even when the EHC floor temperature is equal to or higher than the first predetermined temperature, the ECU 70 controls the electric WP so as to increase the cooling water flow amount when the retention mat temperature is equal to or higher than the third predetermined temperature.

Additionally, in the second cooling control according to the second embodiment, the ECU 70 controls the electric WP so as to increase the cooling water flow amount when such a condition that the cooling water boils is satisfied, similar to the first cooling control according to the second embodiment. Concretely, even when the retention mat temperature is lower than the third predetermined temperature, the ECU 70 increases the cooling water flow amount when such a condition that the cooling water boils is satisfied, in order to prevent the boil of the cooling water.

Next, a description will be given of a concrete process related to the second cooling control, with reference to FIG. 13. FIG. 13 is a flow chart showing a second cooling control process in the second embodiment. The process is repeatedly executed by the ECU 70 in a predetermined cycle. In addition, the process is executed after the hybrid vehicle 100 starts and the electric WP starts driving in order to circulate the cooling water.

Since processes in steps S401 to S407 are similar to the processes in steps S301 to S307 (see FIG. 12), explanations thereof are omitted. Here, a description will be given of processes in steps S408.

The process in step S408 is performed when the EHC floor temperature is equal to or higher than the first predetermined temperature (step S402: Yes). In step S408, the ECU 70 determines whether or not the retention mat temperature is equal to or higher than the third predetermined temperature. The ECU 70 determines whether or not the water-cooling heat release should be preliminarily performed, based on the retention mat temperature. In other words, the ECU 70 determines whether or not the extreme increase in the retention mat temperature occurs.

When the retention mat temperature is equal to or higher than the third predetermined temperature (step S408: Yes), the process goes to step S404. In step S404, the ECU 70 increases the cooling water flow amount in order to prevent the extreme increase in the retention mat temperature and to ensure such a state that the current can be applied to the EHC 13 after the deceleration F/C. For example, the ECU 70 controls the electric WP so that the cooling water flow amount becomes larger than when the retention mat temperature is lower than the third predetermined temperature. Then, the process ends.

The cooling water flow amount which is increased when the retention mat temperature is equal to or higher than the third predetermined temperature may be the same as or different from the cooling water flow amount which is increased when the EHC floor temperature is lower than the first predetermined temperature and the retention mat temperature is equal to or higher than the second predetermined temperature. For example, the ECU 70 determines the increased flow amount in accordance with a degree of the decrease in the retention mat temperature.

Meanwhile, when the retention mat temperature is lower than the third predetermined temperature (step S408: No), the process goes to step S405. In this case, the ECU 70 determines whether or not such a condition that the cooling water boils is satisfied, and controls the cooling water flow amount based on the determination result, similar to the above first cooling control in the second embodiment.

According to the second cooling control in the second embodiment, by preliminarily performing the water-cooling heat release by the cooler 15, it becomes possible to appropriately ensure such a state that the current can be applied to the EHC 13 after the deceleration F/C. Additionally, it is possible to appropriately prevent the boil of the cooling water.

There is a tendency that the temperatures of the components (for example, the positive electrode 13d and/or the negative electrode 13e) in the EHC 13 become high during the high speed driving and/or the high load driving. However, according to the second cooling control, since the water-cooling heat release is performed during the high speed driving and/or the high load driving, it becomes possible to appropriately prevent the temperatures of the components in the EHC 13 from becoming high. Therefore, it becomes possible to improve a durability of the components in the EHC 13.

While the above embodiment shows such an example that the water-cooling control heat release is preliminarily performed when the EHC floor temperature is equal to or higher than the first predetermined temperature and the retention mat temperature is equal to or higher than the third predetermined temperature, it is not limited to use the first predetermined temperature as the determination temperature for determining the EHC floor temperature. Namely, a determination temperature different from the first predetermined temperature may be used, and the water-cooling control heat release may be preliminarily performed when the EHC floor temperature is equal to or higher than the said determination temperature and the retention mat temperature is equal to or higher than the third predetermined temperature. For example, a temperature which is higher than the first predetermined temperature can be used as the said determination temperature.

MODIFICATION

It is not limited that the present invention is applied to the normal hybrid vehicle. The present invention can be applied to a so-called "plug-in hybrid vehicle", too. Additionally, the present invention can be applied to a normal vehicle other than the hybrid vehicle, too.

DESCRIPTION OF REFERENCE NUMBERS

1 Engine
12 Exhaust Passage
13 EHC (Electrically Heated Catalyst)
13a EHC Carrier
13b Retention Mat
13c Case
14, 15 Cooler
70 ECU
100 Hybrid Vehicle

The invention claimed is:

1. An exhaust gas purifying device for an internal combustion engine, comprising:
   an electrically heated catalyst which has a catalyst carrier supporting a catalyst and a carrier retention member which is provided on an outer periphery of the catalyst carrier, which retains the catalyst carrier, and which has an electrical insulation property;
   a cooler which cools the carrier retention member; and
   a controller programmed to control the cooler to cool the carrier retention member so that the temperature of the carrier retention member is lowered to ensure an insulation property of the carrier retention member, when a temperature of the catalyst is lower than a first predetermined temperature and a temperature of the carrier retention member is equal to or higher than a second predetermined temperature;
   the controller is programmed to control the cooler such that the cooler does not cool the carrier retention member when the temperature of the catalyst is equal to or higher than the first predetermined temperature; and
   the controller is programmed to control the cooler such that the cooler does not cool the carrier retention member when the temperature of the carrier retention member is lower than the second predetermined temperature.

2. The exhaust gas purifying device for the internal combustion engine according to claim 1,
   wherein the first predetermined temperature is set based on a determination temperature for determining a catalyst warming, and
   wherein the second predetermined temperature is set based on a determination temperature for determining the insulation property of the carrier retention member.

3. The exhaust gas purifying device for the internal combustion engine according to claim 1,
   wherein, when a temperature of the carrier retention member is equal to or higher than a third predetermined temperature, the controller controls the cooler to cool the carrier retention member so that the temperature of the carrier retention member decreases.

4. The exhaust gas purifying device for the internal combustion engine according to claim 3,
   wherein the third predetermined temperature is set to a temperature which is higher than a determination temperature for determining the insulation property of the carrier retention member.

5. The exhaust gas purifying device for the internal combustion engine according to claim 1,
   wherein the cooler includes a cooling medium passage which is provided on an outer periphery of a case covering the carrier retention member, and in which a cooling medium for cooling the carrier retention member flows along the outer periphery of the case, and
   wherein the cooler includes a flow amount controlling unit which controls a flow amount of the cooling medium which flows in the cooling medium passage.

6. The exhaust gas purifying device for the internal combustion engine according to claim 5,
   wherein the cooler further includes plural projections which are provided in the cooling medium passage and are formed to project from the case.

7. The exhaust gas purifying device for the internal combustion engine according to claim 5,
   wherein the cooler uses an air as the cooling medium.

8. The exhaust gas purifying device for the internal combustion engine according to claim 7,
   wherein the flow amount controlling unit controls a valve which is provided on an air inlet of the cooling medium passage and switches between a flow and a cutoff of the air to the cooling medium passage by being set to an open state and a close state.

9. The exhaust gas purifying device for the internal combustion engine according to claim 5,
   wherein the cooler uses cooling water for cooling the internal combustion engine, as the cooling medium.

10. The exhaust gas purifying device for the internal combustion engine according to claim 9,
    wherein, when such a condition that the cooling water boils is satisfied, the flow amount controlling unit makes the flow amount of the cooling water larger than the amount when the condition is not satisfied.

* * * * *